United States Patent [19]
Bird et al.

[11] 4,169,538
[45] Oct. 2, 1979

[54] ADJUSTABLE DOOR ARRANGEMENT FOR A VACUUM CHAMBER

[75] Inventors: Harry L. Bird, Red Hook; David T. Sutherland, Woodstock, both of N.Y.

[73] Assignee: The Virtis Company, Inc., Gardiner, N.Y.

[21] Appl. No.: 929,118

[22] Filed: Jul. 28, 1978

[51] Int. Cl.$^2$ .................... B65D 43/14; B65D 51/04
[52] U.S. Cl. ................................................. 220/334
[58] Field of Search .................... 220/329, 333, 334; 292/256.69

[56] References Cited

U.S. PATENT DOCUMENTS

| | | | |
|---|---|---|---|
| 2,352,192 | 6/1944 | Gasche | 220/334 X |
| 3,136,007 | 6/1964 | Maher et al. | 220/334 X |
| 3,373,893 | 3/1968 | Dunkelis | 220/334 |

*Primary Examiner*—George T. Hall
*Attorney, Agent, or Firm*—Kirkland & Ellis

[57] ABSTRACT

Disclosed is a door and hinge frame arrangement for external-pressure vessels or vacuum chambers which has a five-way adjustment capability to assure that the door properly seals over the chamber entrance without the necessity for the application of large forces. A chamber door (which may be either circular or square) is pivotally mounted in a vertical position between ends of horizontal arms of a "C" shaped frame assembly. The "C" shaped frame comprises a vertical hinge member which is pivotally mounted at the bottom and top ends thereof, and the two horizontal arms extend from opposite ends of the straight member. Thrust bearings are provided to support the weight of the door and frame at the lower pivot of the vertical member. The vertical position of the door and frame can be adjusted by varying the thickness of the thrust bearings at this point. Similarly, the vertical position of the door with respect to the frame can be varied by varying the width of thrust bearings at the lower pivot point where the door is mounted to the lower arm. Further, the horizontal position of the lower pivot point with respect to the lower arm can be varied by loosening bolts holding a slotted fitting and moving the fitting and pivot point linearly with respect to the arm. The horizontal position of the upper pivot point with respect to the upper arm can similarly be varied by loosening bolts in a slotted bearing block and moving the bearing block back and forth with respect to the arm. Finally, the upper arm comprises a first portion mounted to the pivotably mounted straight member and a second portion which is pivotably mounted to the free end of the first portion intermediate the ends of the second portion. A spring biased bolt arrangement is provided to allow the second portion to be adjustably pivoted with respect to the first portion so that the vertical alignment of the upper pivot point with respect to the lower pivot point can be adjusted thus changing the vertical plane of the door to conform to the plane of the face of the entrance of the vacuum chamber.

6 Claims, 7 Drawing Figures

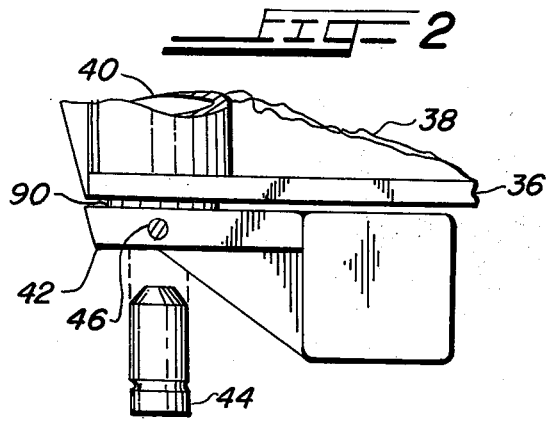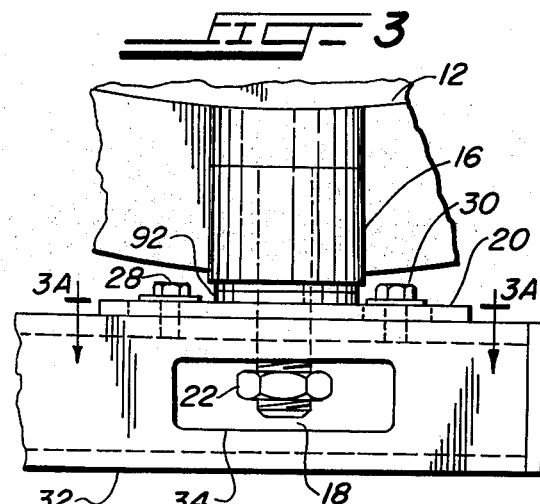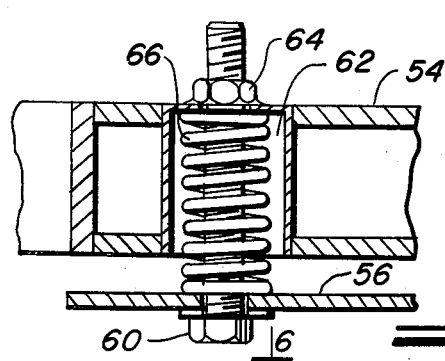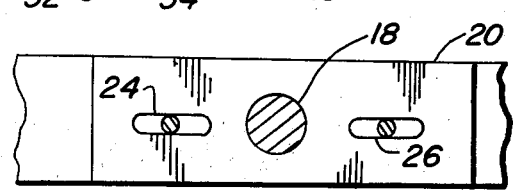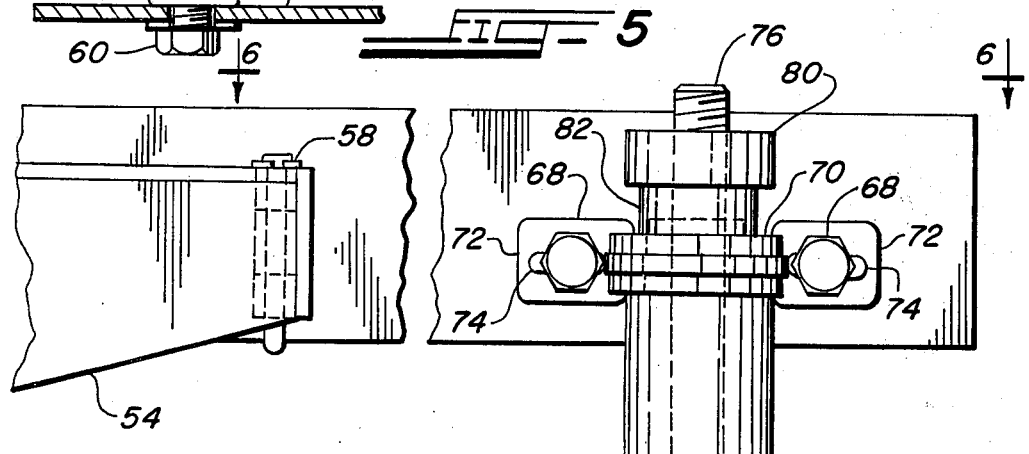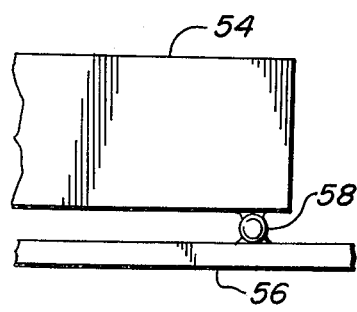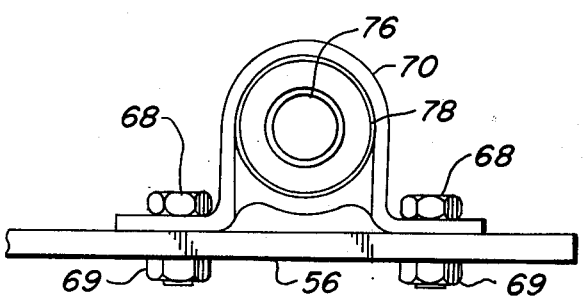

ADJUSTABLE DOOR ARRANGEMENT FOR A VACUUM CHAMBER

BACKGROUND OF THE INVENTION

1. Field of the Invention

The present invention relates to door arrangements for vacuum chambers, and more particularly, to adjustable door arrangements for permitting multiple axis adjustments of the alignment of a door to conform to the alignment and configuration of a vacuum chamber entrance.

2. Description of the Prior Art

Vacuum chambers for freeze drying apparatus and other vacuum equipment are well known in the art. Typically, in the prior art, doors for closing the entrances to such vacuum chambers have had conventional hinges mounted along one edge of the door joining that edge of the door to the edge of the vacuum chamber entrance. However, since it is very desirable to have the door align very accurately with the entrance to the vacuum chamber so that the seals or gaskets will properly preclude the entrance of air into the vacuum chamber when the chamber is being evacuated by a vacuum pump, it is desirable to permit various adjustments of the door so that it will fit properly over the entrance.

Heretofore in the art, some minor adjustments have been permissible, typically the door is sealed by force applying latches. Prior to the present invention, no door arrangement has allowed five separate adjustments to be made to the vertical and horizontal position of the door. Consequently, the present invention provides clear advantages over the prior art structures.

BRIEF DESCRIPTION OF THE INVENTION

An adjustable door arrangement in accordance with the present invention for closing an entrance to a vacuum chamber comprises a frame assembly including a vertically disposed hinge member pivotably mounted at an upper end and a lower end thereof, a lower arm member mounted at one end to the lower end of the hinge member and the other end extending essentially horizontally therefrom, and an upper arm member mounted at one end to the upper end of the hinge member and the other end extending essentially horizontally therefrom essentially parallel to the lower arm member. A door dimension to fit over the entrance to the vacuum chamber is pivotably mounted at upper and lower pivot points between the extending ends of the upper and lower arm members. First means is provided for adjusting the position of the frame assembly and the door vertically with respect to the vacuum chamber. Second means is provided for adjusting the position of the door vertically with respect to the frame assembly. Third means is provided for adjusting the position of the lower pivot point of the door horizontally with respect to the lower arm member. Fourth means is provided for adjusting the position of the upper pivot point of the door horizontally with respect to the upper arm member. Fifth means is provided for adjusting the upper arm member in a horizontal plane so that the relative vertical alignment of the upper pivot point of the door with respect to the lower pivot point of the door can be varied.

Thus, it is a principal object of the present invention to provide an adjustable door arrangement for a vacuum chamber wherein the alignment of the door can be adjusted along all major axes.

Yet another object of the present invention is to provide an adjustable door arrangement for a vacuum chamber wherein the door is pivotably mounted to a "C" shaped frame assembly and the "C" shaped frame assembly is also pivotably mounted so that the door can be opened in a confined space.

Yet another object of the present invention is to provide an adjustable door arrangement for a vacuum chamber wherein the position of the door can be adjusted in five different ways to assure a vacuum-tight seal over the entrance to the vacuum chamber.

These and other objects, advantages and features shall hereinafter appear, and for the purposes of illustration, but not for limitation, an exemplary embodiment of the present invention is illustrated in the accompanying drawings and described in the detailed description.

DESCRIPTION OF THE DRAWINGS

FIG. 2 is an enlarged partially fragmentary partial exploded view of the lower pivot point of the frame assembly of the present invention.

FIG. 3 is an enlarged partially fragmentary view of the lower pivot point of the door illustrated in FIG. 1.

FIG. 3A is a cross-sectional partially fragmentary view taken substantially along line 3A—3A in FIG. 3.

FIG. 4 is a partially cross-sectional partially fragmentary view taken substantially along line 4—4 in FIG. 1.

FIG. 5 is a rear view of the structure illustrated in FIG. 6.

FIG. 6 is a top, partially fragmentary view taken substantially along lines 6—6 in FIG. 1.

DETAILED DESCRIPTION OF THE PREFERRED EMBODIMENT

Figure 1:
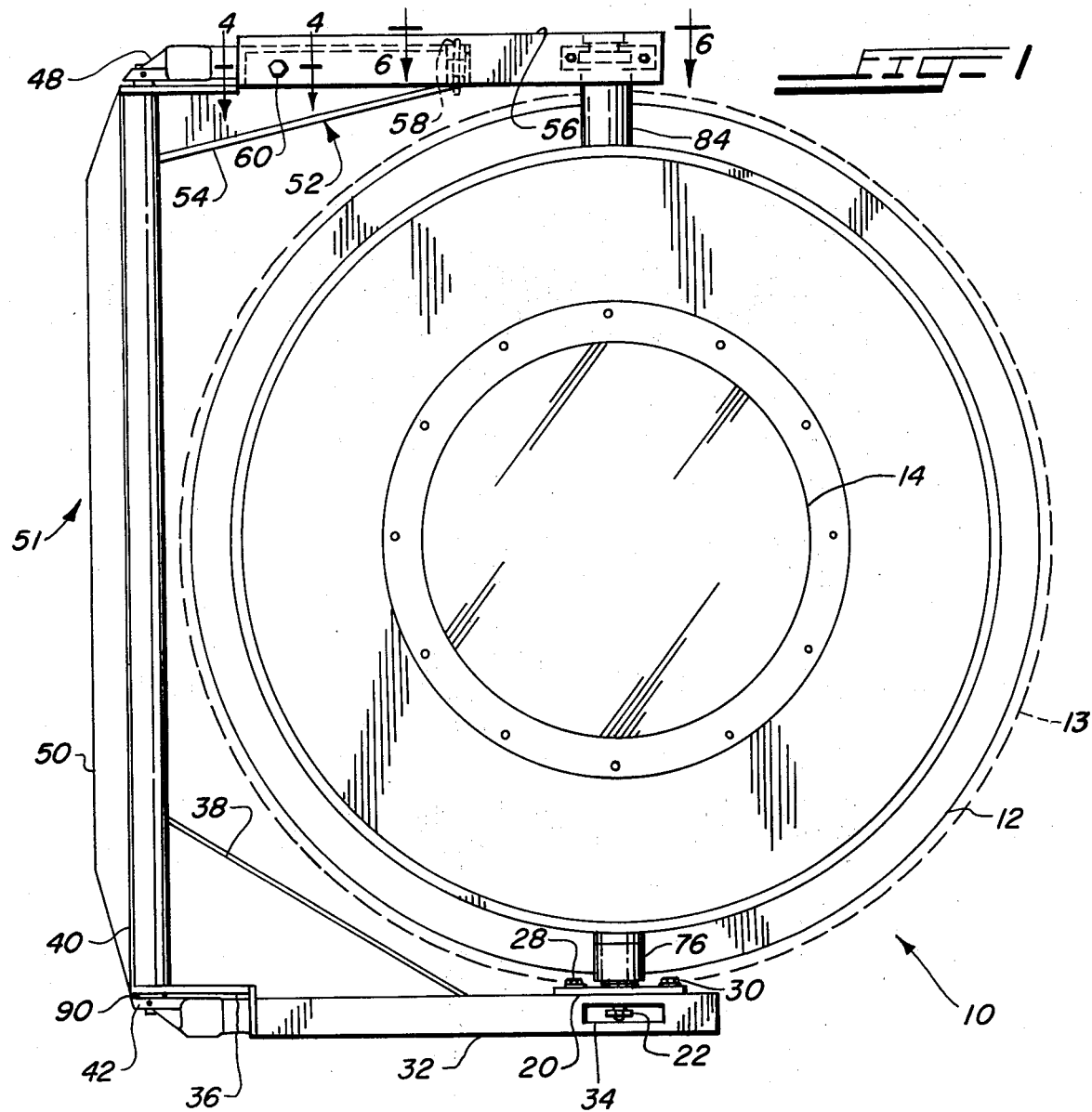
FIG. 1 is a front elevational view of a preferred embodiment of the present invention.

With reference to FIG. 1, adjustable door arrangement 10 comprises a circular door 12 having a transparent window 14 at the center thereof to permit viewing of the interior of the vacuum chamber 13 (shown in dotted lines in FIG. 1) over the entrance to which door 12 is positioned. Mounted at the lower edge of door 12 is a bushing 16 (see FIG. 3) into which extends a pivot shaft 18. Shaft 18 extends through an opening in an adjustment plate 20 (see FIG. 3A) and a nut 22 is threaded on the threaded lower end of shaft 18 to secure it to plate 20. Adjustment plate 20 has slots 24 and 26 formed therethrough, aligned with the length of plate 20. Bolts 28 and 30 extend through slots 24 and 26 and are threaded into threaded openings in a lower arm member 32. Arm member 32 comprises a conventional welded box construction and has an opening 34 to the center thereof to allow adjustment of bolt 22.

Welded to one end of arm 32 is an L-shaped bracket 36 and a triangular member 38 which in turn are welded to a vertically positioned hinge member 40. One end of hinge member 40 is mounted to a stationary support bracket 42 by a pivot pin 44 (see FIG. 2) which extends through an opening in support bracket 42 and is retained in position in bracket 42 by a set screw 46. Support bracket 42 is stationarily mounted to the vacuum chamber 13. The upper end of hinge member 40 is also similarly pivotably mounted to an upper support bracket 48, and a reinforcing strut 50 is welded along the outer edge of vertical hinge member 40 to provide strength and rigidity. Upper support bracket 48 is also stationarily mounted to the vacuum chamber 13.

Welded to the upper end of hinge member 40 and extending outwardly therefrom is an upper arm assembly 52. Upper arm assembly 52 comprises a first portion 54 welded at one end to hinge member 40. A second portion 56 of upper arm assembly 52 is pivotably mounted to the other end of the first portion 54 by a hinge and pin arrangement 58 (see FIGS. 5 and 6) attached intermediate the ends of the second portion 56.

Inserted through an opening adjacent a first end of second portion 56 is a bolt 60 (see FIG. 4). Bolt 60 extends through a hollow recess 62 in first portion 54 and is threaded into a nut 64 that is welded to the back of first portion 54. A compression spring 66 is compressed between the surface of second portion 56 and first portion 54 of upper arm assembly 52.

Mounted on a second end of second portion 56 by bolts 68 and nuts 69 is a pillow block 70. Pillow block 70 has two mounting flanges 72 having slots 74 formed therein and bolts 68 extend through slots 74. A pivot shaft 76 extends through a bearing 78 mounted in pillow block 70 and a stop ring 80 and a pillow block stop 82 are mounted on the end of shaft 76. Shaft 76 extends into an upper bushing 84 which is mounted to the upper portion of door 12. Thus, lower arm member 32, hinge member 40 and upper arm assembly 52 form a "C" shaped frame assembly 51 that pivotably supports door 12.

With reference to FIGS. 1 and 2, hinge member 40 is pivotably supported and separated from support bracket 42 by a thrust bearing 90. Thrust bearing 90 can be of any desired thickness, and may be composed of a multiplicity of said bearings, each of any desired thickness. By varying the thickness of thrust bearing 90, the vertical position of the entire frame assembly 51 and door 12 can be adjusted with respect to the vacuum chamber 13. Thus, by varying the width of thrust bearing 90, a first means of adjusting the position of the door arrangement is provided.

With respect to FIGS. 1 and 3, a thrust bearing 92 is positioned between bushing 16 and plate 20 to pivotably support door 12. Thrust bearing 92 can be of any desired thickness, and may be composed of a multiplicity of said bearings, each of any desired thickness. By changing the thickness of thrust bearing 92, a second means of adjusting the vertical position of door 12 with respect to lower arm member 32 is provided.

With reference to FIGS. 1, 3 and 3A, when bolts 28 and 32 are loosened, plate 20 can be moved back and forth along slots 24 and 26 to move the lower pivot point, i.e., shaft 18, of door 12 to further assist in aligning the door 12 over the entrance of the vacuum chamber 13. Once the lower pivot point is in the desired position, bolts 28 and 30 can be retightened to lock plate 20 in position. Thus, plate 20 and bolts 28 and 30 provide a third means for adjusting the position of the lower pivot point of the door horizontally with respect to, and along the lower arm member.

With respect to FIGS. 1, 5 and 6, when bolts 68 are loosened, pillow block 70 can be moved horizontally with respect to upper arm assembly 52 along slots 74. Thus, a fourth means for adjusting the position of the upper pivot point, i.e., shaft 76, of the door 12 horizontally with respect to and along the upper arm member is provided to further assist in positioning the door 12 over entrance of the vacuum chamber 13 to assure a vacuum-tight seal. Finally, to assure that the plane of the door 12 is aligned and parallel with the plane of the surface of the entrance of the vacuum chamber, bolt 60 can be adjusted to cause the second portion 56 of upper arm assembly 52 to pivot with respect to the first portion so that the vertical alignment of the pivot shafts 76 and 18 can be varied with respect to one another. This allows the plane of door 12 to be varied slightly on either side of a perfect vertical to assure that the plane of the door 12 is in alignment with the plane of the entrance of the vacuum chamber. Thus, a fifth means for adjusting the upper arm member in a horizontal plane is provided so that the relative vertical alignment of the upper pivot point of the door with respect to the lower pivot point of the door can be adjusted.

As can be seen, five distinct adjustments can be made to the relative position of the door with respect to the entrance of the vacuum chamber to assure that the door will properly align with the vacuum chamber entrance. This allows the door to be optimally adjusted to conform with the irregularities of either the door or entrance geometry to assure proper closing and sealing without the necessity for the application of large forces against either the door or the chamber. Also, the structure disclosed herein provides two pivot points when opening the door so that the frame assembly can be pivoted with respect to the vacuum chamber, and the door can be pivoted with respect to the frame assembly. This permits the door to be opened in more confined spaces which is advantageous both in a laboratory as well as a commercial environment where space is at a premium.

It should be apparent from the foregoing description that various changes, alterations, or modifications may be made to the structure described herein without departing from the spirit and scope of the present invention as defined in the appended claims.

We claim:

1. An adjustable door arrangement for closing an entrance to a vacuum chamber comprising:
   a frame assembly including
     a vertically disposed hinge member pivotably mounted at an upper end at a lower end thereof to supporting structure connected to the vacuum chamber;
     a lower arm member mounted at one end to the lower end of said hinge member and the other end extending essentially horizontally therefrom;
     an upper arm member mounted at one end to the upper end of said hinge member and the other end extending essentially horizontally therefrom essentially parallel to said lower arm member;
   a door dimensioned to fit over the entrance of the vacuum chamber, said door pivotably mounted at upper and lower pivot points between the extended ends of said upper and lower arm members;
   first means for adjusting the position of said frame assembly and said door vertically with respect to the vacuum chamber;
   second means for adjusting the position of said door vertically with respect to said frame assembly;
   third means for adjusting the position of the lower pivot point of said door horizontally along said lower arm member;
   fourth means for adjusting the position of the upper pivot point of said door horizontally along said upper arm member;
   fifth means for adjusting said upper arm member in a horizontal plane so that the relative vertical alignment of the upper pivot point of said door with respect to the lower pivot point of said door can be varied.

2. An adjustable door arrangement, as claimed in claim 1, wherein said first means comprises thrust bearings of varying thicknesses insertable between the supporting structure and the lower end of said vertically disposed hinge member.

3. An adjustable door arrangement, as claimed in claim 1, wherein said second means comprises thrust bearings of varying thicknesses insertable at the lower pivot point of said door between said door and said lower arm member.

4. An adjustable door arrangement, as claimed in claim 1, wherein said third means comprises:
an adjustment plate having slots formed therein said slots aligned essentially linearly with said lower arm member, said plate having the lower pivot point comprising a pivot shaft mounted thereon, and bolts extending through said slots and threadably connected to said lower arm members to adjustably mount said plate to said lower arm member.

5. An adjustable door arrangement, as claimed in claim 1, wherein said fourth means comprises:
a bearing block having slots formed therein, said slots aligned essentially linearly with said upper arm, said bearing block mounting the upper pivot point of said door, and bolts extending through said slots and threadably connected to said upper arm member to adjustably mount said plate to said upper arm member.

6. An adjustable door arrangement, as claimed in claim 1, wherein said upper arm comprises:
a first portion mounted at one end to said hinge member and the other end extending outwardly from said hinge member;
a second portion pivotably mounted intermediate first and second ends thereof to the other end of said first portion, said second end having said upper pivot point of said door mounted thereto; and
said fifth means comprises:
a bolt threadably engaging said first portion and extending through an opening in the first end of said second portion and a spring biasing means mounted between said first and second portions adjacent said bolt so that rotation of said bolt causes said second portion to pivot with respect to said first portion.

* * * * *